US012703214B2

(12) United States Patent
Lee

(10) Patent No.: US 12,703,214 B2
(45) Date of Patent: Aug. 11, 2026

(54) ROBOT

(71) Applicant: LG ELECTRONICS INC., Seoul (KR)

(72) Inventor: Haklim Lee, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 665 days.

(21) Appl. No.: 18/030,894

(22) PCT Filed: Aug. 30, 2021

(86) PCT No.: PCT/KR2021/011596
§ 371 (c)(1),
(2) Date: Apr. 7, 2023

(87) PCT Pub. No.: WO2022/075592
PCT Pub. Date: Apr. 14, 2022

(65) Prior Publication Data

US 2024/0017580 A1 Jan. 18, 2024

(30) Foreign Application Priority Data

Oct. 8, 2020 (KR) ........................ 10-2020-0130025

(51) Int. Cl.
*B60G 7/00* (2006.01)
*B60B 33/04* (2006.01)
*B60K 7/00* (2006.01)

(52) U.S. Cl.
CPC ............ *B60G 7/001* (2013.01); *B60B 33/045* (2013.01); *B60K 7/0007* (2013.01); *B60K 2007/0092* (2013.01)

(58) Field of Classification Search
CPC ........ B60G 7/001; B60G 7/003; B60G 7/008; B60G 7/04; B25J 5/00; B25J 5/007;
(Continued)

(56) References Cited

U.S. PATENT DOCUMENTS 4,093,199 A * 6/1978 Hefner ................. B25H 1/0007 269/61
4,128,137 A * 12/1978 Booth ...................... B62D 7/00 180/907
(Continued)

FOREIGN PATENT DOCUMENTS

CN 110709314 A 1/2020
JP 2003-312480 A 11/2003
(Continued)

OTHER PUBLICATIONS

International Search Report (PCT/ISA/210) issued in PCT/KR2021/011596, dated Nov. 24, 2021.

*Primary Examiner* — Steve Clemmons

(74) *Attorney, Agent, or Firm* — Birch, Stewart, Kolasch & Birch, LLP

(57) ABSTRACT

A robot includes a robot frame having a bottom plate; and at least one wheel module mounted to the bottom plate. The wheel module includes a front hinge mounted to the bottom plate; a rear hinge mounted to the bottom plate and having a pin guide formed therein; a link motor arm rotatably connected to the front hinge by a first hinge shaft; a front caster provided in the link motor arm; an in-wheel motor including a motor connected to the link motor arm and a driving wheel rotated by the motor; a link back arm rotatably connected to the link motor arm by a second hinge shaft; a guide pin provided in the link back arm and slidingly guided along the pin guide; and a rear caster provided in the link back arm.

20 Claims, 9 Drawing Sheets

(58) Field of Classification Search
CPC .......... B25J 5/0007; A61G 5/043; A61G 5/06; A61G 5/10; A61G 5/1078
See application file for complete search history.

(56) References Cited

U.S. PATENT DOCUMENTS

| | | | | |
|---|---|---|---|---|
| 4,840,394 A * | 6/1989 | Bickler | B60G 5/01 280/682 |
| 6,533,306 B2 * | 3/2003 | Watkins | A61G 5/043 280/301 |
| 7,066,290 B2 * | 6/2006 | Fought | A61G 5/043 280/755 |
| 7,506,709 B2 * | 3/2009 | Kiwak | A61G 5/1078 280/124.1 |
| 7,828,310 B2 * | 11/2010 | Vreeswijk | A61G 5/043 280/755 |
| 8,469,383 B2 * | 6/2013 | Zhou | A61G 5/1078 180/209 |
| 10,206,832 B2 * | 2/2019 | Danielsson | A61G 5/1089 |
| 10,350,981 B2 * | 7/2019 | Peng | B60K 17/043 |
| 2007/0119635 A1 | 5/2007 | Lee et al. | |
| 2012/0012416 A1 | 1/2012 | Mirzaie | |
| 2020/0206916 A1 | 7/2020 | Jung et al. | |
| 2021/0145667 A1 | 5/2021 | Batke | |

FOREIGN PATENT DOCUMENTS

| | | | |
|---|---|---|---|
| JP | 2006-109105 A | | 7/2006 |
| JP | 2020-19348 A | | 2/2020 |
| KR | 10-0757842 B1 | | 9/2007 |
| KR | 10-2017-0010184 A | | 1/2017 |
| KR | 10-2020-0085661 A | | 7/2020 |
| TW | 201519882 A | * | 6/2015 |
| WO | WO 2019/195911 A1 | | 10/2019 |

* cited by examiner

【Fig. 1】
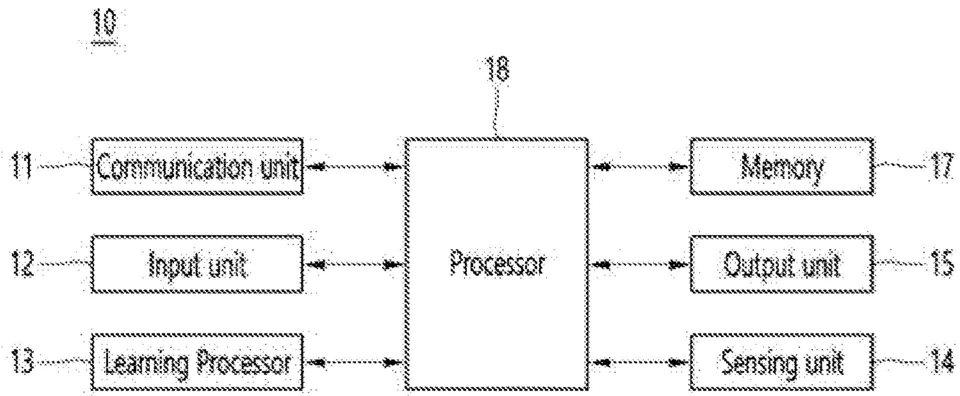
【Fig. 2】
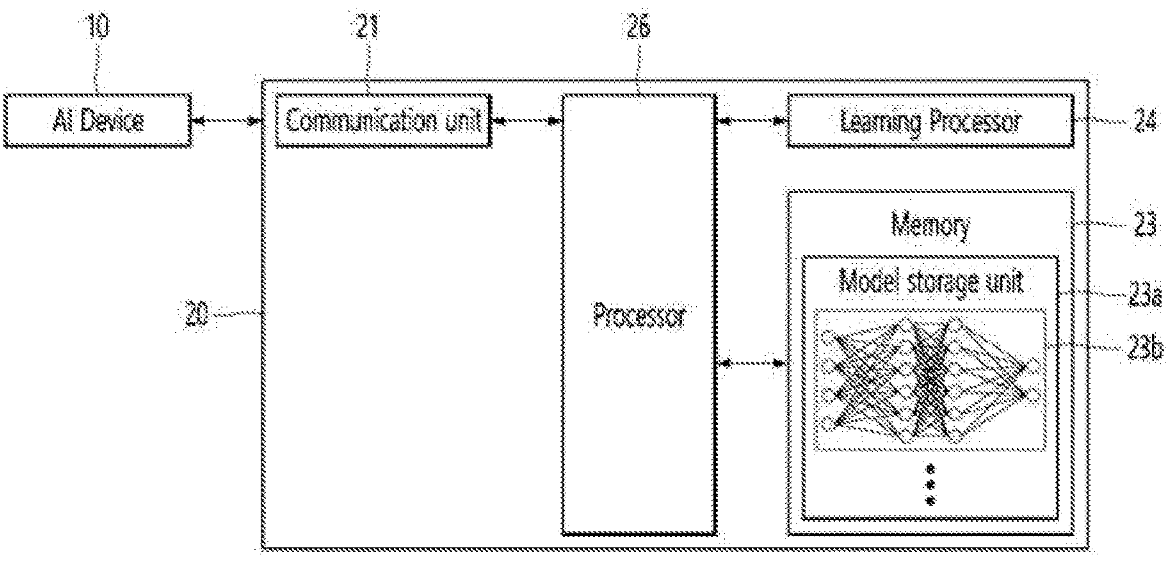

【Fig. 3】
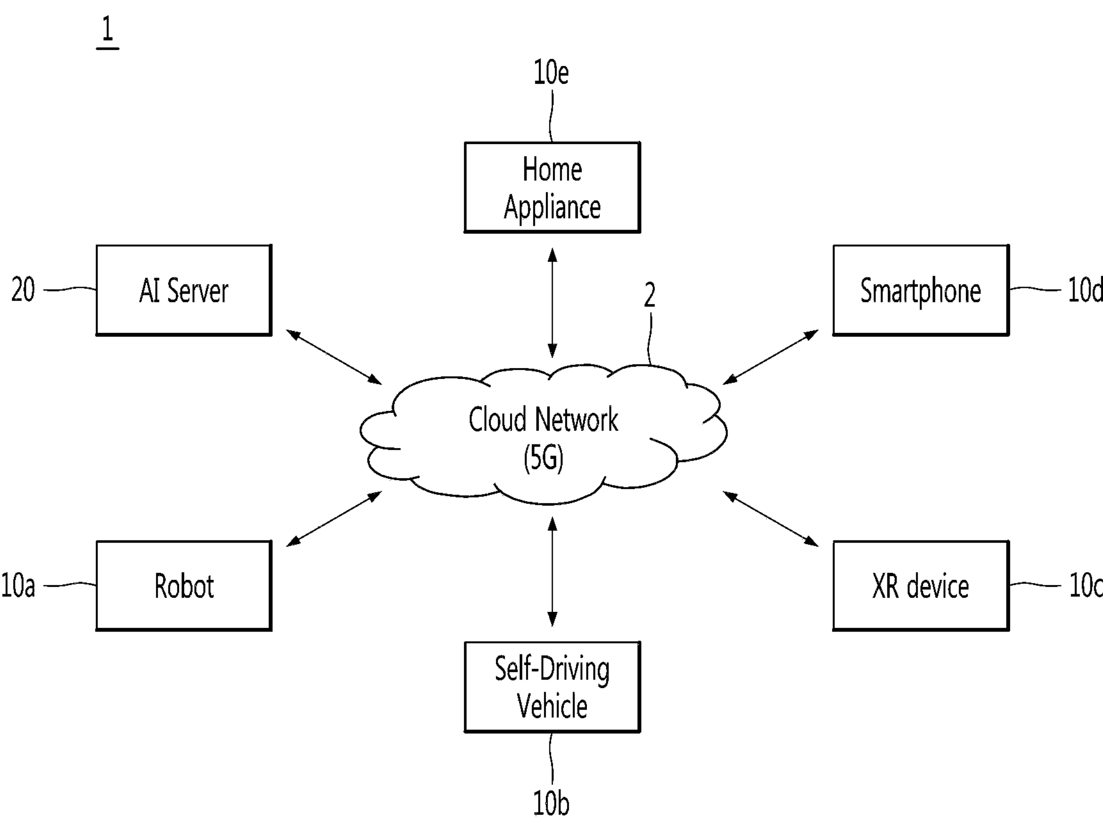

【Fig. 4】
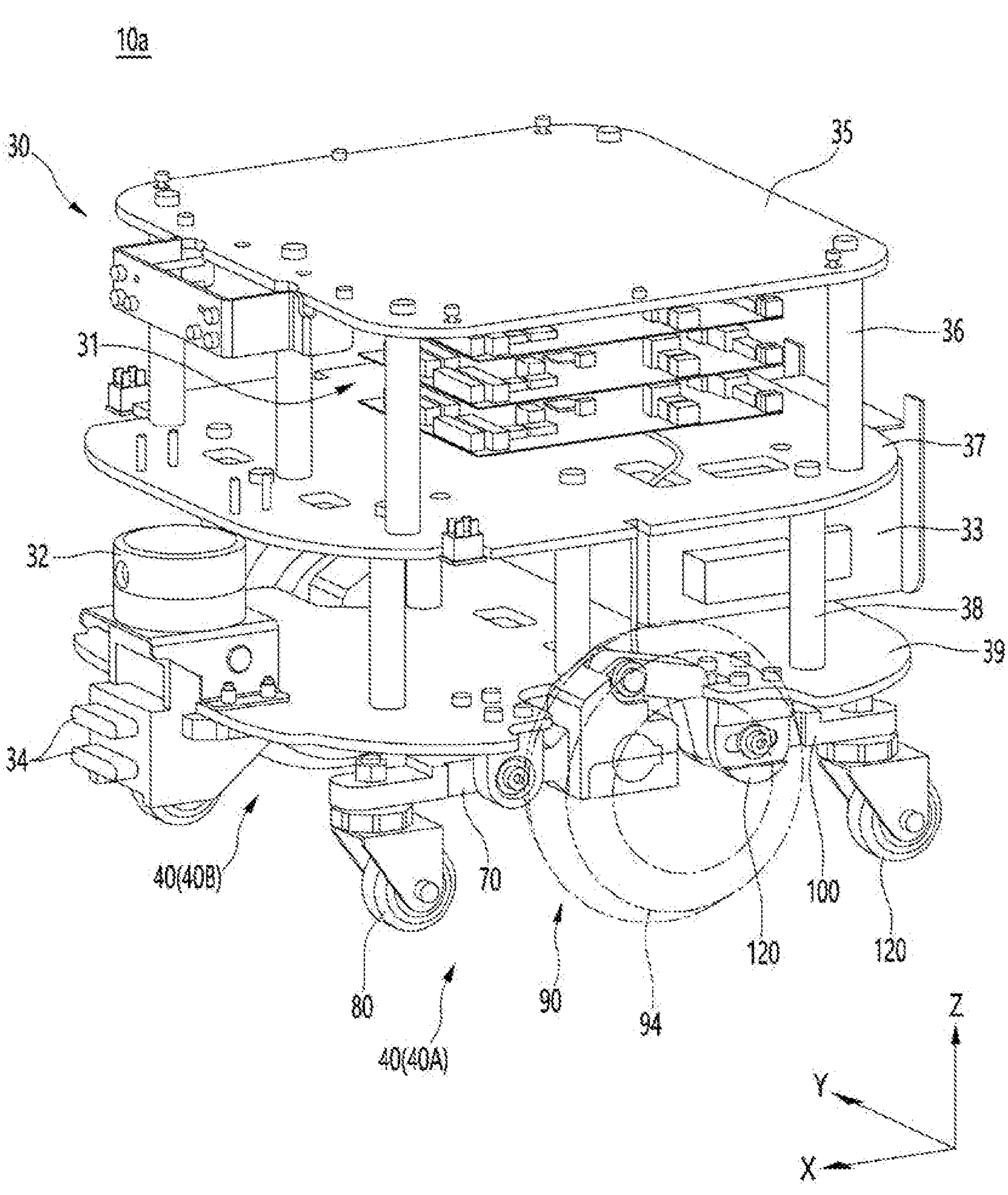

【Fig. 5】
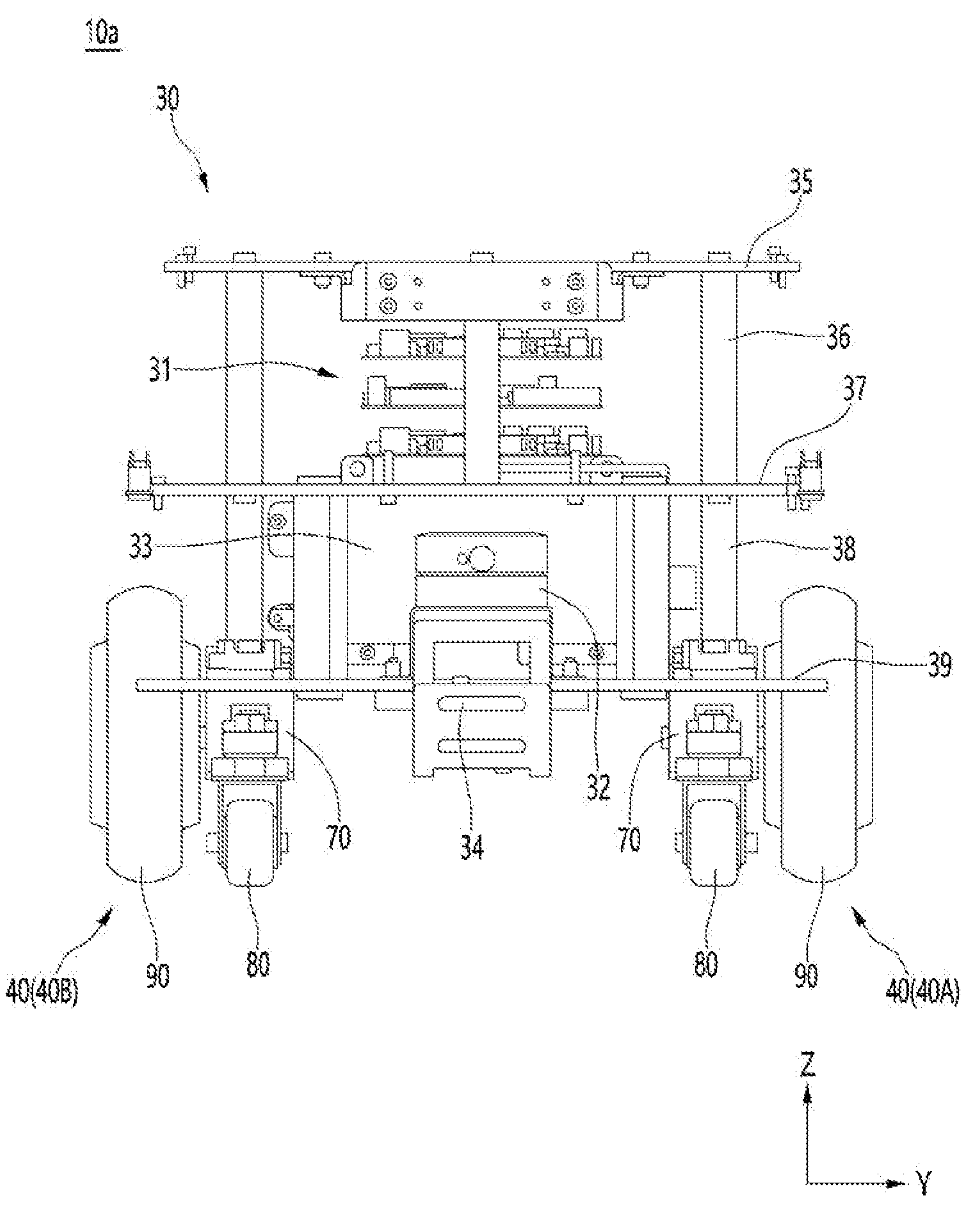

【Fig. 6】
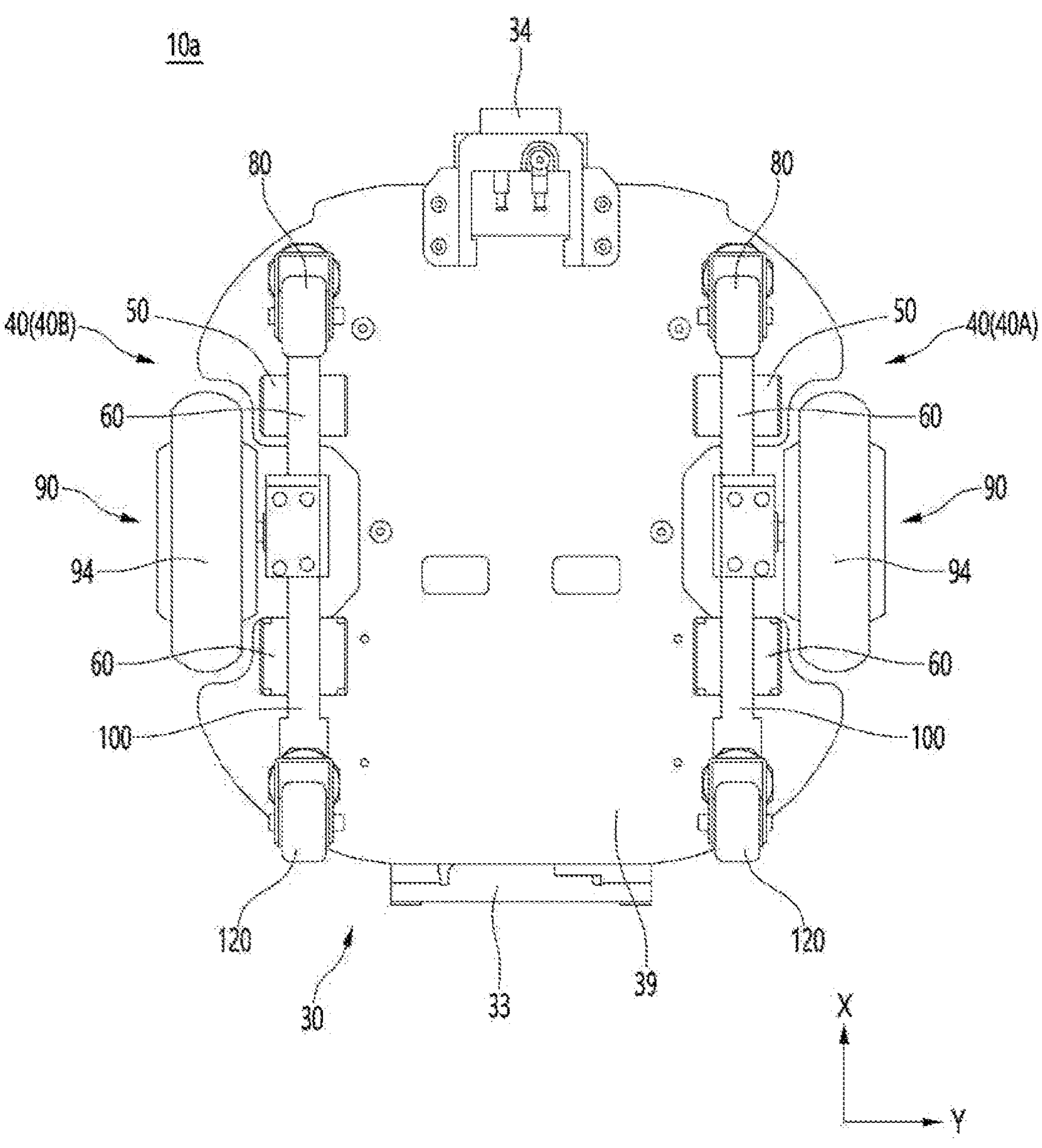

【Fig. 7】
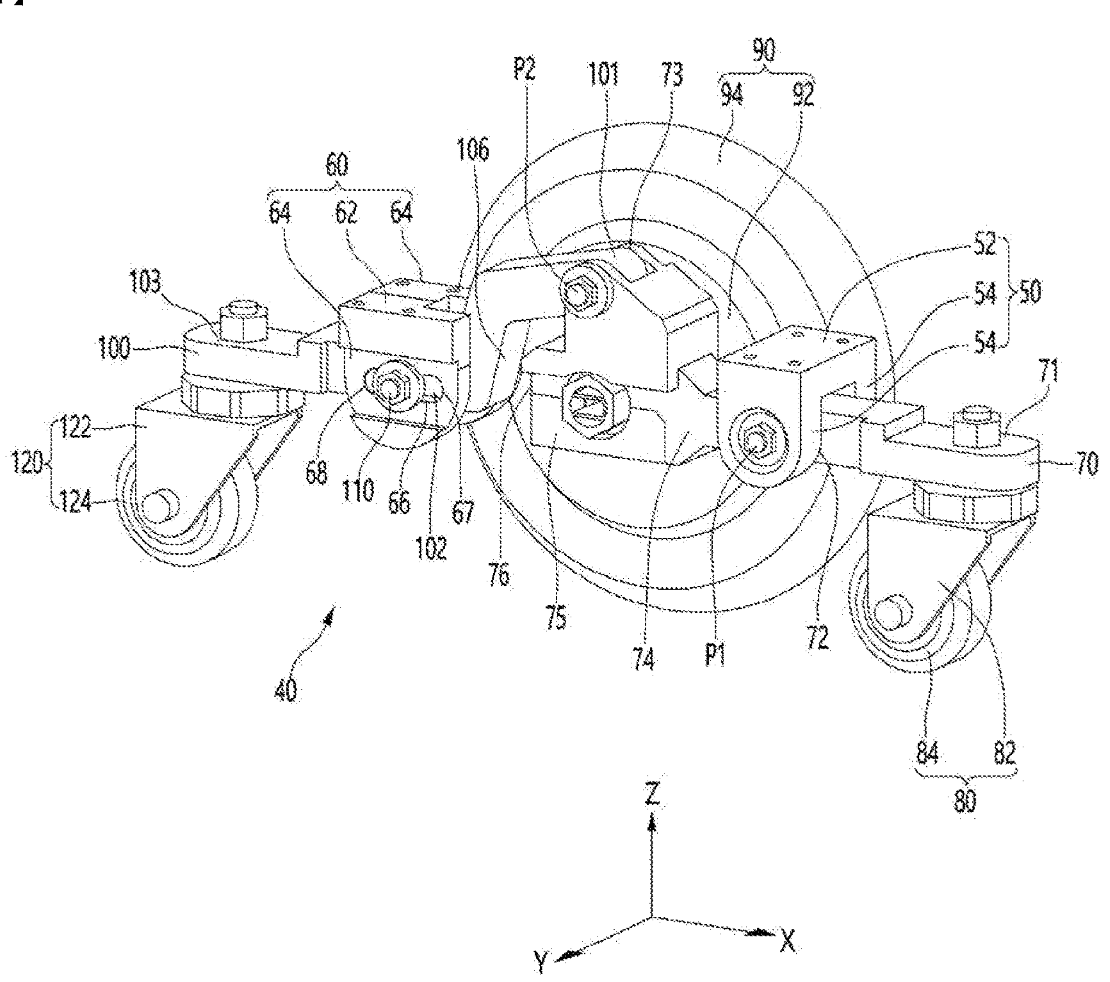

【Fig. 8】
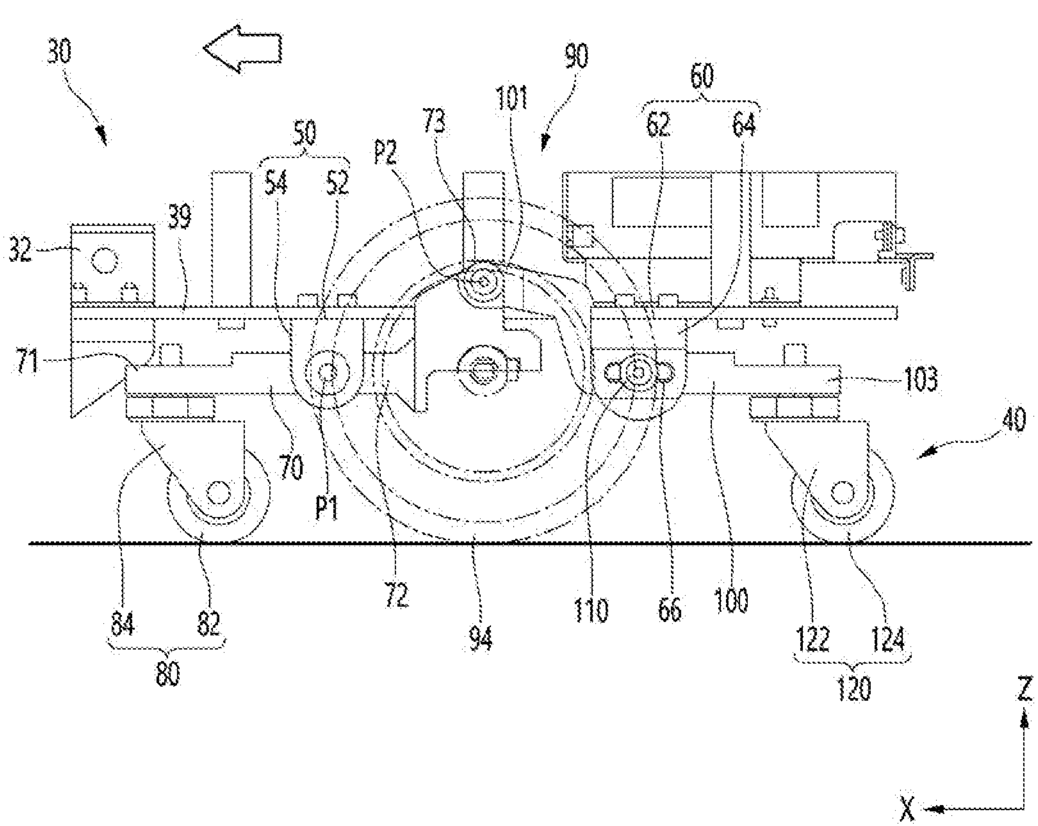

【Fig. 9】
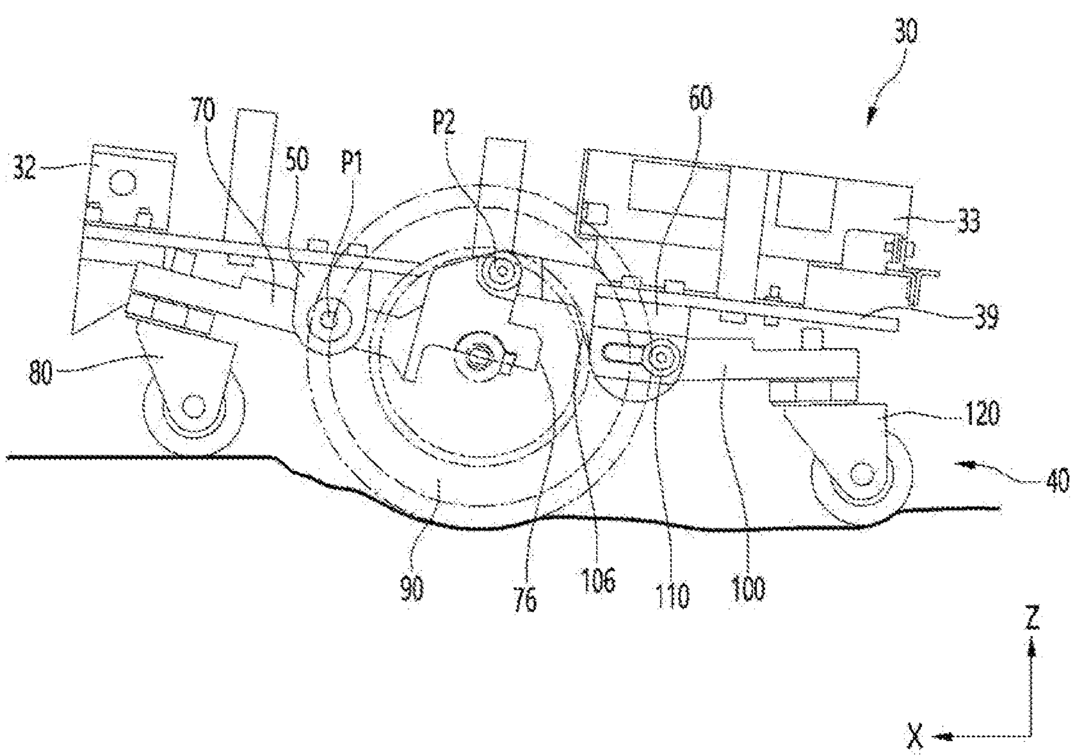
【Fig. 10】
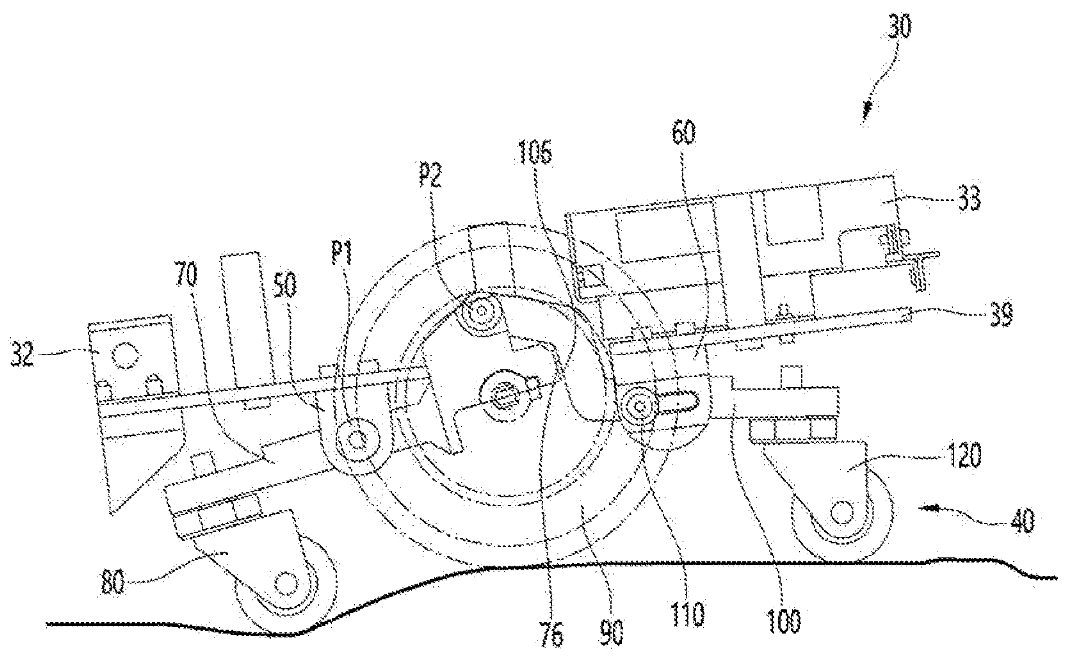

【Fig. 11】
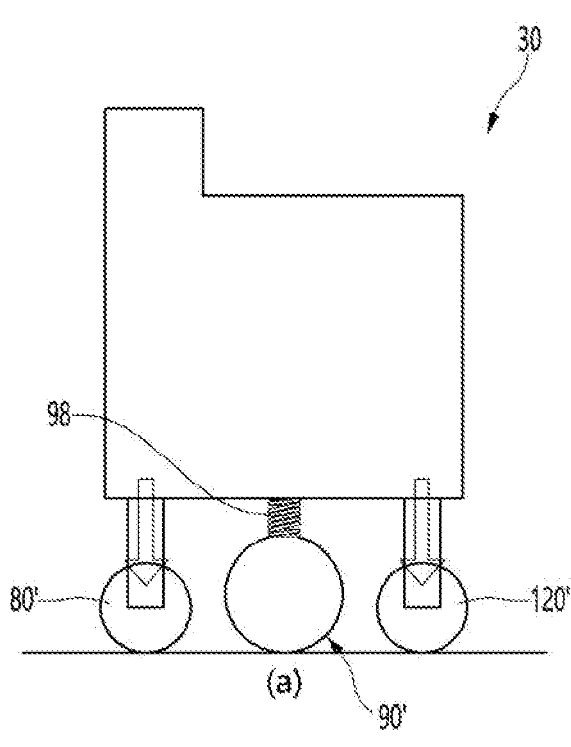
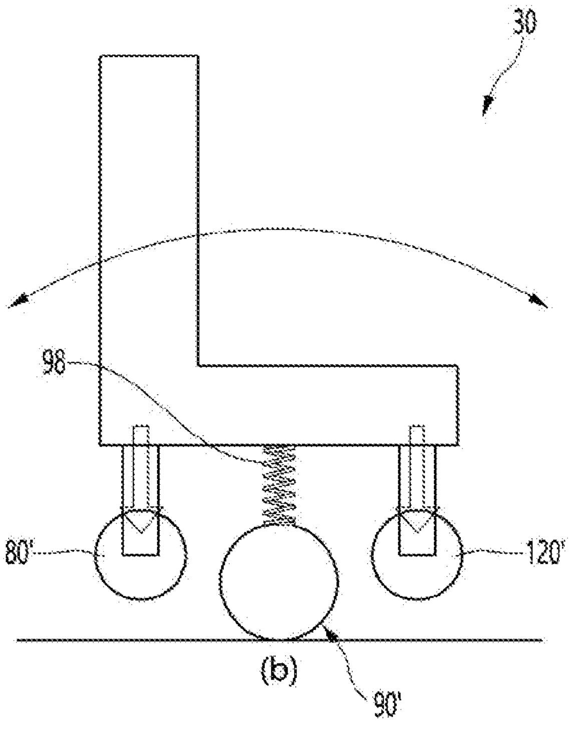

ROBOT

CROSS-REFERENCE TO RELATED APPLICATIONS

This application is the National Phase of PCT International Application No. PCT/KR2021/011596, filed on Aug. 30, 2021, which claims priority under 35 U.S.C. § 119(a) to Patent Application No. 10-2020-0130025, filed in the Republic of Korea on Oct. 8, 2020, all of which are hereby expressly incorporated by reference into the present application.

TECHNICAL FIELD

The present invention relates to robots, and more particularly to robots having drive wheels and casters.

BACKGROUND ART

A robot is a machine that automatically processes or operates a given task by own capabilities thereof, and the application fields of robots can be generally classified into industrial, medical, space, subsea use, and the like and can be used in various fields.

An example of the robot may include a driving wheel, a front caster, and a rear caster, and such a robot is disclosed in Korean Patent Publication No. 10-2020-0085661 A1 (published on Jul. 15, 2020).

The robot includes a main body equipped with a driving unit, and the driving unit includes a drive wheel rotating around a drive shaft formed long in a left and right direction; and a driving motor providing rotational power to the driving wheel; a front caster provided on the front portion of the lower surface of the main body; and a rear caster provided on the rear portion of the bottom surface of the main body.

The robot may pass through a terrain where the ground is elevated or a terrain where the ground is lowered, and when the heights of the front caster and the rear caster are different, the front caster or the rear caster may lift off the ground, and the driving wheels may lose grip force not to be able to be driven.

DISCLOSURE

Technical Problem

An object of the present invention is to provide a robot in which a front caster, a drive wheel, and a rear caster interlock so that the front caster, the drive wheel, and the rear caster can contact the ground, and the grip force of the drive wheel is maintained.

Another object of the present invention is to provide a robot to which a wheel module can be applied without being restricted by the shape or weight of a robot set.

Technical Solution

A robot according to the present embodiment may include a robot frame having a bottom plate; and at least one wheel module mounted on the bottom plate.

At least one wheel module includes a front hinge mounted on the bottom plate; a rear hinge mounted on the bottom plate and having a pin guide; a link motor arm rotatably connected to the front hinge with a first hinge shaft; a front caster installed on the link motor arm; an in-wheel motor having a motor connected to the link motor arm and a drive wheel rotated by the motor; a link back arm rotatably connected to the link motor arm with a second hinge shaft; a guide pin installed on the link back arm and sliding along the pin guide; and a rear caster installed on the link back arm.

In the link motor arm, a front caster mount to which the front caster is mounted may be formed in a front portion, a first hinge shaft penetrating portion through which the first hinge shaft passes may be formed in a central portion, and a second hinge shaft penetrating portion through which the second hinge shaft passes may be formed in a rear portion.

The front hinge may include a front mounter fastened to the bottom plate with a fastening member; and a pair of side brackets protruding from the front mounter and spaced apart in a left and right direction.

The first hinge shaft may pass through the pair of side brackets and the first hinge shaft penetrating portion.

A height of the second hinge shaft may be higher than a height of the first hinge shaft.

The link motor arm may include an upper arm surrounding an upper portion of a support shaft of the motor; and a lower arm surrounding a lower portion of the support shaft of the motor and is fastened to the upper arm.

On one of the link motor arm and the link back arm, a protrusion protruding toward the other of the link motor arm and the link back arm may be formed, and on the other of the link motor arm and the link back arm, a stop surface coming into contact with the protrusion or spaced apart from the protrusion may be formed.

The protrusion may move away from the stop surface when a height of the front caster is higher than a height of the rear caster, and the protrusion may approach the stop surface when the height of the front caster is lower than the height of the rear caster.

The pin guide may be a guide hole formed long in a front and rear direction of the rear hinge.

The guide hole may include a rear end to which the guide pin is engaged when the second hinge shaft descends; and a front end to which the guide pin is engaged when the second hinge shaft is raised.

In the link back arm, a second hinge shaft penetrating portion through which the second hinge shaft passes may be formed in a front portion; a guide pin mount to which the guide pin is mounted may be formed in a central portion; and a rear caster mount to which the rear caster is mounted may be formed in a rear portion.

The rear hinge may include a rear mounter fastened to the bottom plate with a fastening member; and a pair of side brackets protruding from the front mounter and spaced apart in the left and right direction, and the guide pin may pass through the pair of side brackets and the guide pin mount.

At least one wheel module may include a left wheel module mounted on the bottom plate; and a right wheel module mounted on the bottom plate to be spaced apart from a left wheel module.

Advantageous Effect

According to the present embodiment, the drive wheel and the rear caster interlock according to a movement of the front caster according to a change of the ground, so that the front caster, the drive wheel, and the rear caster can uniformly contact the ground, and the robot can drive more stably.

In addition, since the front caster, driving wheel, and rear casters of the wheel module interlock, it is possible to secure grip force suitable for the weight of the robot set without being restricted by the weight of the robot set, and to generate appropriate driving torque according to the weight of the robot set, and thus energy consumption is reduced.

In addition, as the front caster, drive wheel, and rear caster of the wheel module interlock according to the ground and the heights thereof are corrected, the grip force can be kept constant, and the robot can be protected from external shocks.

In addition, the wheel module is not affected by the weight or shape of the robot set, and its efficiency can be maximized as a shared module.

In addition, as the two front casters, the two drive wheels, and the two rear casters interlock according to the ground, and the heights thereof are corrected, the grip force can be kept constant, and the robot can be protected from external shocks.

DESCRIPTION OF DRAWINGS

FIG. 1 illustrates an artificial intelligence (AI) device including a robot according to an embodiment of the present disclosure.

FIG. 2 illustrates an AI server connected to a robot according to an embodiment of the present disclosure.

FIG. 3 illustrates an AI system according to an embodiment of the present disclosure.

FIG. 4 is a perspective view illustrating a robot according to the present embodiment.

FIG. 5 is a front view illustrating the inside of the robot according to the present embodiment.

FIG. 6 is a bottom view illustrating the robot according to this embodiment.

FIG. 7 is an enlarged perspective view illustrating a wheel module according to the present embodiment.

FIG. 8 is a side view illustrating when the robot moves forward on a flat ground according to the present embodiment.

FIG. 9 is a side view illustrating a wheel module when the ground is elevated while the robot moves forward according to the present embodiment.

FIG. 10 is a side view illustrating a wheel module when the ground is lowered while the robot moves forward according to the present embodiment.

FIG. 11 is a side view illustrating comparative examples compared with the present embodiment.

BEST MODE

Hereinafter, specific embodiments of the present invention will be described in detail with drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communicator 11, an input interface 12, a learning processor 13, a sensor 14, an output interface 15, a memory 17, and a processor 18.

The communicator 11 may transmit and receive data to and from external devices such as other AI devices 10*a* to 10*e* and the AI server 20 by using wire/wireless communication technology. For example, the communicator 11 may transmit and receive sensor information, a user input, a learning model, and a control signal to and from external devices.

The communication technology used by the communicator 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI device 10 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communicator 21, a memory 23, a learning processor 24, a processor 26, and the like.

The communicator 21 can transmit and receive data to and from an external device such as the AI device 10.

The memory 23 may include a model storage unit 23*a*. The model storage unit 23*a* may store a learning or learned model (or an artificial neural network 23*b*) through the learning processor 24.

The learning processor 24 may learn the artificial neural network 23*b* by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 20, a robot 10*a*, a self-driving vehicle 10*b*, an extended reality (XR) device 10*c*, a smartphone 10*d*, or a home appliance 10*e* is connected to a cloud network 2. The robot 10*a*, the self-driving vehicle 10*b*, the XR device 10*c*, the smartphone 10*d*, or the home appliance 10*e*, to which the AI technology is applied, may be referred to as AI devices 10*a* to 10*e*.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10*a* to 10*e* and 20 configuring the AI system 1 may be connected to each other through the cloud network 2. In particular, each of the devices 10*a* to 10*e* and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10*a*, the self-driving vehicle 10*b*, the XR device 10*c*, the smartphone 10*d*, or the home appliance 10*e* through the cloud network 2, and may assist at least part of AI processing of the connected AI devices 10*a* to 10*e*.

At this time, the AI server 20 may learn the artificial neural network according to the machine learning algorithm instead of the AI devices 10*a* to 10*e*, and may directly store the learning model or transmit the learning model to the AI devices 10*a* to 10*e*.

At this time, the AI server 20 may receive input data from the AI devices 10*a* to 10*e*, may infer the result value for the received input data by using the learning model, may generate a response or a control command based on the inferred result value, and may transmit the response or the control command to the AI devices 10*a* to 10*e*.

Alternatively, the AI devices 10*a* to 10*e* may infer the result value for the input data by directly using the learning model, and may generate the response or the control command based on the inference result.

Hereinafter, various embodiments of the AI devices 10*a* to 10*e* to which the above-described technology is applied will be described. The AI devices 10*a* to 10*e* illustrated in FIG. 3 may be regarded as a specific embodiment of the AI device 10 illustrated in FIG. 1.

<AI+Robot>

The robot 10*a*, to which the AI technology is applied, may be implemented as a guide robot, a carrying robot, a cleaning robot, a wearable robot, an entertainment robot, a pet robot, an unmanned flying robot, or the like.

The robot 10*a* may include a robot control module for controlling the operation, and the robot control module may refer to a software module or a chip implementing the software module by hardware.

The robot 10*a* may acquire state information about the robot 10*a* by using sensor information acquired from various kinds of sensors, may detect (recognize) surrounding environment and objects, may generate map data, may determine the route and the travel plan, may determine the response to user interaction, or may determine the operation.

The robot 10*a* may use the sensor information acquired from at least one sensor among the lidar, the radar, and the camera so as to determine the travel route and the travel plan.

The robot 10*a* may perform the above-described operations by using the learning model composed of at least one artificial neural network. For example, the robot 10*a* may recognize the surrounding environment and the objects by using the learning model, and may determine the operation by using the recognized surrounding information or object information. The learning model may be learned directly from the robot 10*a* or may be learned from an external device such as the AI server 20.

At this time, the robot 10*a* may perform the operation by generating the result by directly using the learning model, but the sensor information may be transmitted to the external device such as the AI server 20 and the generated result may be received to perform the operation.

The robot 10*a* may use at least one of the map data, the object information detected from the sensor information, or the object information acquired from the external apparatus to determine the travel route and the travel plan, and may control the driving unit such that the robot 10*a* travels along the determined travel route and travel plan.

The map data may include object identification information about various objects arranged in the space in which the robot 10*a* moves. For example, the map data may include object identification information about fixed objects such as walls and doors and movable objects such as pollen and desks. The object identification information may include a name, a type, a distance, and a position.

In addition, the robot 10*a* may perform the operation or travel by controlling the driving unit based on the control/interaction of the user. At this time, the robot 10*a* may acquire the intention information of the interaction due to the user's operation or speech utterance, and may determine the response based on the acquired intention information, and may perform the operation.

<AI+Robot+Self-Driving>

The robot 10*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 10*a*, to which the AI technology and the self-driving technology are applied, may refer to the robot itself having the self-driving function or the robot 10*a* interacting with the self-driving vehicle 10*b*.

The robot 10*a* having the self-driving function may collectively refer to a device that moves for itself along the given movement line without the user's control or moves for itself by determining the movement line by itself.

The robot 10*a* and the self-driving vehicle 10*b* having the self-driving function may use a common sensing method so as to determine at least one of the travel route or the travel plan. For example, the robot 10*a* and the self-driving vehicle 10*b* having the self-driving function may determine at least one of the travel route or the travel plan by using the information sensed through the lidar, the radar, and the camera.

The robot 10*a* that interacts with the self-driving vehicle 10*b* exists separately from the self-driving vehicle 10*b* and may perform operations interworking with the self-driving function of the self-driving vehicle 10*b* or interworking with the user who rides on the self-driving vehicle 10*b*.

At this time, the robot 10*a* interacting with the self-driving vehicle 10*b* may control or assist the self-driving function of the self-driving vehicle 10*b* by acquiring sensor information on behalf of the self-driving vehicle 10*b* and providing the sensor information to the self-driving vehicle 10*b*, or by acquiring sensor information, generating environment information or object information, and providing the information to the self-driving vehicle 10*b*.

Alternatively, the robot 10*a* interacting with the self-driving vehicle 10*b* may monitor the user boarding the self-driving vehicle 10*b*, or may control the function of the self-driving vehicle 10*b* through the interaction with the user. For example, when it is determined that the driver is in a drowsy state, the robot 10*a* may activate the self-driving function of the self-driving vehicle 10*b* or assist the control of the driving unit of the self-driving vehicle 10*b*. The function of the self-driving vehicle 10*b* controlled by the robot 10*a* may include not only the self-driving function but also the function provided by the navigation system or the audio system provided in the self-driving vehicle 10*b*.

Alternatively, the robot 10*a* that interacts with the self-driving vehicle 10*b* may provide information or assist the function to the self-driving vehicle 10*b* outside the self-driving vehicle 10*b*. For example, the robot 10*a* may provide traffic information including signal information and the like, such as a smart signal, to the self-driving vehicle 10*b*, and automatically connect an electric charger to a charging port by interacting with the self-driving vehicle 10*b* like an automatic electric charger of an electric vehicle.

FIG. 4 is a perspective view illustrating a robot according to the present embodiment, FIG. 5 is a front view illustrating the inside of the robot according to the present embodiment, and FIG. 6 is a bottom view illustrating the robot according to this embodiment.

The robot 10*a* may include a robot frame 30 and at least one wheel module 40.

An example of the robot 10*a* may be a delivery robot capable of transporting various items such as food and medicine, or delivery items (hereinafter referred to as delivery items).

When the robot 10*a* is a delivery robot, at least one carrier or bracket on which a delivery item is placed may be disposed on the robot frame 30.

The robot frame 30 may be composed of a combination of a plurality of members and may be a robot main body.

The robot 10*a* may further include a main board 31, a LIDAR 32, a battery 33, and a charging terminal 34, and the main board 31, the LIDAR 32, the battery 33, and the charging terminal 34 may be installed on the robot frame 30.

The main board 31 is a board that controls the robot 10*a*, and a plurality of main boards may be arranged. The main board 31 may include a motor drive for controlling a driving motor, a navigation mode for controlling a travel path of the robot 10*a*, and a UI (CPU) load for controlling overall operations of the robot 10*a*.

The LIDAR 32 is a radar system that measures the positional coordinates of a reflector by measuring the time it takes for laser pulses to be emitted and reflected back.

The robot 10*a* may further include an outer case (not illustrated) forming an outer appearance of the robot 10*a*, and the outer case may be coupled to the robot frame 30 to protect components installed in the robot frame 30.

The robot frame 30 may include an upper plate 35, a middle plate 37, and a bottom plate 39, and a main board 31, a LIDAR 32, a battery 33, and a charging terminal 34 may be distributed in the upper plate 35, the middle plate 37, and the bottom plate 39.

The upper plate 35, the middle plate 37, and the bottom plate 39 may be spaced apart from each other in the upward direction Z. Each of the upper plate 35, the middle plate 37, and the bottom plate 39 may be disposed substantially horizontally.

The robot frame 30 may further include an upper supporter 36 disposed on the middle plate 37 to support the upper plate 35 and a lower supporter 38 disposed on the lower plate 39 to support the middle plate 37.

The upper supporter 36 may be coupled to each of the middle plate 37 and the upper plate 35.

The lower supporter 38 may be coupled to each of the lower plate 39 and the middle plate 37.

At least one wheel module 40 may be mounted on the robot frame 30, in particular, the bottom plate 39.

A plurality of wheel modules 40 may be provided on the bottom plate 39. The plurality of wheel modules 40 may include a left wheel module 40A and a right wheel module 40B. The left wheel module 40A and the right wheel module 40B may be installed symmetrically in the left and right direction and may be spaced apart in the left and right direction Y.

The left wheel module 40A may be disposed on the left side of the robot frame 30 with respect to the center of the robot frame 30, and the right wheel module 40B may be disposed on the right side of the robot frame 30 with respect to the center of the robot frame 30.

The left wheel module 40A and the right wheel module 40B may have the same structure.

The wheel module 40 is not limited to the shape and weight of the robot set and may be fixed to the bottom plate 39 in units of modules, and the robot manufacturer may manufacture and combine driving portions in units of modules.

Hereinafter, the left wheel module 40A and the right wheel module 40B are described in a state of being referred to as wheel modules 40.

FIG. 7 is an enlarged perspective view illustrating a wheel module according to the present embodiment, FIG. 8 is a side view illustrating when the robot moves forward on a flat ground according to the present embodiment, FIG. 9 is a side view illustrating a wheel module when the ground is elevated while the robot moves forward according to the present embodiment, and FIG. 10 is a side view illustrating a wheel module when the ground is lowered while the robot moves forward according to the present embodiment.

The wheel module 40 may include a front hinge 50, a rear hinge 60, a link motor arm 70, a front caster 80, an in-wheel motor 90, a link back arm 100, a guide pin 110, and a rear caster 120.

The wheel module 40 may be an interlocking link module in which the link motor arm 70 and the link back arm 100 interlock.

The front hinge 50 and the rear hinge 60 may be fixed in position to the robot frame 30, in particular, the bottom plate 39, and each of the front hinge 50 and the rear hinge 60 may be a fixed point based on the robot set.

The link motor arm 70 and the link back arm 100 may be disposed on the front hinge 50 and the rear hinge 60, respectively, and the front caster 80, the in-wheel motor 90, and the rear caster 120 may be positioned on the link motor arm 70 and the link back arm 100 in a distributed manner.

Hereinafter, each configuration of the wheel module 40 will be described.

The front hinge 50 may be mounted on the robot frame 30. The front hinge 50 may be mounted on the front portion of the robot frame 30, and the front portion of the robot frame 30 may be defined as the forepart based on the center of the robot frame 30 in the front and rear direction X.

The front hinge 50 may be mounted on the bottom plate 39 and may be mounted on the bottom plate 39 by a fastening member such as a screw.

The front hinge 50 may include a front mounter 52 and a pair of side brackets 54. The front mounter 52 may be fastened to the bottom plate 39 by a fastening member. A pair of side brackets 54 protrude from the front mounter 52 and may be spaced apart in the left and right direction Y. A pair of side brackets 54 may protrude from the side of the front mounter 52 in the lower direction.

The first hinge shaft P1 may pass through the pair of side brackets 54 of the front hinge 50 and the first hinge shaft penetrating portion 72 formed in the central portion of the link motor arm 70.

The first hinge shaft P1 may be a rotational center of the link motor arm 70.

The rear hinge 60 may be mounted on the rear portion of the robot frame 30. The rear portion of the robot frame 30 may be defined as the back portion based on the center of the robot frame 30 in the front and rear direction X.

The rear hinge 60 may be mounted on the bottom plate 39, may be mounted on the bottom plate 39 with a fastening member such as a screw, and may be mounted spaced apart from the front hinge 50 in the front and rear direction.

The rear hinge 60 may include a rear mounter 62 and a pair of side brackets 64. The rear mounter 62 may be fastened to the bottom plate 39 with a fastening member. A pair of side brackets 64 protrude from the rear mounter 64 and may be spaced apart in the left and right direction Y. A pair of side brackets 64 may protrude from the side of the rear mounter 62 in the rear direction.

A pin guide 66 guided by the guide pin 110 may be formed on the rear hinge 60. The pin guide 66 may be a guide hole formed long in the rear hinge 60 in the front and rear direction X and may be, for example, a long hole.

The pin guide 66 is open to each of the pair of brackets 64 of the rear hinge 60 in the left and right direction Y and may be formed long in the front and rear direction X.

The pin guide 66, which is a guide hole, may include a front end 67 and a rear end 68 spaced apart from the front end 67 in the front and rear direction X, and the guide pin 110 may be moved between the front end 67 of the pin guide 66 and the rear end 68 of the pin guide 66.

The rear hinge 60 may be a sliding connector to which the link back arm 100 is slidably connected by the guide pin 110.

The link motor arm 70 may be a link front arm disposed in front of the link back arm 100.

The link motor arm 70 may be rotatably connected to the front hinge 50 with a first hinge shaft P1. The link motor arm 70 may rotate around the front hinge 50 in the vertical direction.

The link motor arm 70 may be disposed long in the front and rear direction X with respect to the front hinge 50 and may be disposed substantially horizontally under the bottom plate 39. The link motor arm 70 may be spaced apart from the bottom plate 39 in the vertical direction Z.

The front portion of the link motor arm 70 may be defined as a portion positioned in front of the first hinge shaft P1 with respect to the first hinge shaft P1, and the rear portion of the link motor arm 70 may be defined as a portion positioned at the rear of the first hinge shaft P1 with respect to the first hinge shaft P1.

A front caster mounting portion 71 to which the front caster 80 is mounted may be formed at the front portion of the link motor arm 70. In the front caster mounting portion 71, a through hole through which a vertical axis of the front caster 80 passes may be opened in the vertical direction Z.

A first hinge shaft penetrating portion 72 through which the first hinge shaft P1 passes may be formed at the central portion of the link motor arm 70. A first hinge shaft through-hole through which the first hinge shaft P1 passes may be opened in the first hinge shaft through-portion 72 in the left and right direction Y.

A second hinge shaft penetrating portion 73 through which the second hinge shaft P2 passes may be formed at a rear portion of the link motor arm 70. A second hinge shaft through-hole passing through the second hinge shaft P2 may be opened in the second hinge shaft through-portion 73 in the left and right direction Y. The height of the second hinge shaft penetrating portion 73 may be higher than that of the first hinge shaft penetrating portion 72.

The link motor arm 70 may be formed of a combination of a plurality of members. The link motor arm 70 may include an upper arm 74 and a lower arm 75.

The upper arm 74 may surround an upper portion of the support shaft of the motor 92. A front caster mounting portion 71, a first hinge shaft penetrating portion 72, and a second hinge shaft penetrating portion 73 may be formed in the upper arm 74.

The lower arm 75 may surround the lower portion of the support shaft of the motor 92 and be engaged with the upper arm 74. The lower arm 75 may be disposed under the upper arm 74 and may be coupled to the upper arm 74 with a fastening member such as a screw.

The front caster 80 may be installed on the link motor arm 70. The front caster 80 may be installed at the front portion of the link motor arm 70.

The front caster 80 may include a caster body 82 and a front wheel 84.

The caster body 82 may be installed at the front portion of the link motor arm 70. The caster body 82 may include a vertical axis installed on the link motor arm 70.

The front wheel 84 may be disposed to be rotated about a horizontal axis on the caster body 82.

The in-wheel motor 90 may be connected to the rear portion of the link motor arm 70.

The in-wheel motor 90 may have a motor 92 and a driving wheel 94.

Motor 92 may be coupled to link motor arm 70.

The drive wheel 94 can be rotated by the motor 92. The drive wheel 94 may be connected to the rotational shaft of the motor or to a reducer connected to the rotational shaft of the motor 92.

A drive wheel 94 may be positioned next to the rear portion of the link motor arm 70.

The link back arm 100 may be rotatably connected to the link motor arm 70 with the second hinge shaft P2.

The second hinge shaft P2 may be a connection point at which the link back arm 100 and the link motor arm 70 are connected, and the second hinge shaft P2 may be positioned in a region where the link back arm 100 and the link motor arm 70 do not collide in each rotation range of the link back arm 100 and the link motor arm 70 and the link back arm 100 is formed in a shape bent in a predetermined shape.

The height of the second hinge shaft P2 may be higher than the height of the first hinge shaft P1. A height from the ground to the second hinge shaft P2 may be higher than a height from the ground to the first hinge shaft P1.

The second hinge shaft P2 may be the center of rotation of the link motor arm 70 and may be the center of rotation of the link back arm 100.

The link motor arm 70 and the link back arm 100 may be connected by a second hinge shaft P2.

The link motor arm 70 and the link back arm 100 may rotate in opposite directions about the second hinge shaft P2. When the link motor arm 70 is rotated clockwise about the second hinge shaft P2, the link back arm 100 can be rotated counterclockwise about the second hinge shaft P2, and when the link motor arm 70 is rotated counterclockwise about the second hinge shaft P2, the link back arm 100 can be rotated clockwise about the second hinge shaft P2.

When the link back arm 100 is rotated clockwise or the link back arm 100 is rotated counterclockwise, the link back arm 100 can be slidingly guided by the rear hinge 60.

The link back arm 100 may be slidably connected to the rear hinge 60 by the guide pin 110.

A second hinge shaft through-portion 101 through which the second hinge shaft P2 passes may be formed in the front portion of the link back arm 100. A second hinge shaft through-hole through which the second hinge shaft P2 passes may be opened in the second hinge shaft through-portion 101 in the left and right direction Y.

A guide pin mounting portion 102 to which the guide pin 110 is mounted may be formed at the central portion of the link back arm 100. The guide pin mounting portion 102 may be defined as a portion positioned between a pair of brackets 64 of the rear hinge 60 of the link back arm 100. A guide pin through-hole through which the guide pin 110 passes may be opened in the guide pin mounting portion 102 in the left and right direction Y.

A rear caster mounting portion 103 to which a rear caster 120 is mounted may be formed at a rear portion of the link back arm 100. In the rear caster mounting portion 103, a through hole through which a vertical axis of the rear caster 120 passes may be opened in the vertical direction Z.

When the link motor arm 70 is rotated about the front hinge 50, as illustrated in FIGS. 9 and 10 by the shape of the ground, the link back arm 100 connected to the link motor arm 70 by the second hinge shaft P2 is rotated in the opposite direction to the link motor arm 70 by the force of the link motor arm 70 to rotate, and at this time, when the guide pin 110 connected to the link back arm 100 is a guided along the pin guide 66, the link back arm 100 is rotated while moving in an approximate front and rear direction X.

When the front caster 80 is raised or lowered according to the shape of the ground, the drive wheel 74 descends or is raised, resulting in a suspension effect. Since the rear casters 120 interlock, a suspension effect is generated.

That is, since the movements of the two casters 80 and 120 occur simultaneously, a change in the height of the drive wheel 94 occurs.

The guide pin 110 may be installed on the link back arm 100. The guide pin 110 may pass through a pair of side brackets 64 of the rear hinge 60 and the guide pin mounting portion 102 of the link back arm 100.

The guide pin 100 may slide and guide along the pin guide 66 when the link back arm 100 rotates.

The rear casters 120 may be installed on the link back arm 100. The rear caster 120 may be installed at the rear portion of the link back arm 100.

The rear caster 120 may include a caster body 122 and a rear wheel 124.

The caster body 122 may be installed at the rear portion of the link back arm 100. The caster body 122 may include a vertical axis installed on the link back arm 100.

The front wheel 84 may be disposed to be rotated about a horizontal axis on the caster body 82.

Meanwhile, on one of the link motor arm 70 and the link back arm 100, a protrusion 76 protruding toward the other one of the link motor arm 70 and the link back arm 100 may be formed.

On the other one of the link motor arm 70 and the link back arm 100, a stop surface 106 with which the protrusion 76 comes into contact or from which the protrusion 76 is spaced apart may be formed.

As illustrated in FIG. 9, when the height of the front caster 80 is higher than the height of the rear caster 120, the second hinge shaft P2 can descend by the link motor arm 70, and when the second hinge shaft P2 is lowered, the guide pin 110 may be engaged with the rear end 68 of the pin guide 66.

As illustrated in FIG. 9, when the height of the front caster 80 is higher than the height of the rear caster 120, the protrusion 76 may move away from the stop surface 106.

As illustrated in FIG. 10, when the height of the front caster 80 is lower than the height of the rear caster 120, the second hinge shaft P2 can be raised by the link motor arm 70 and the guide pin 110 may be engaged with the front end 67 of the pin guide 66.

As illustrated in FIG. 10, when the height of the front caster 80 is lower than the height of the rear caster 120, the protrusion 76 may approach the stop surface 106.

Hereinafter, the action of the robot 10*a* configured as above will be described.

First, when the motor 92 of the in-wheel motor 90 is driven, the driving wheel 94 of the in-wheel motor 90 is rotated. As illustrated in FIG. 8, the height of the lower end of the drive wheel 94, the height of the lower end of the front caster 80, and the height of the lower end of the rear caster 120 through which the robot 10*a* passes through a flat area can be the same.

The link motor arm 70 and the link back arm 100 may be substantially horizontal, and the driving wheel 94, the front caster 80, and the rear caster 120 rotate while uniformly contacting the ground. and the robot 10*a* can travel stably by the rotation of the driving wheel 94.

As illustrated in FIG. 9, when the robot 10*a* passes through an elevated ground, the link motor arm 70 is rotated around the first hinge shaft P1 according to the shape of the ground, and the link motor arm 70 may be tilted obliquely so that the front end thereof faces upward.

When the link motor arm 70 rotates, the link back arm 100 is rotated about the second hinge shaft P2, and all the height of the rear portion of the link motor arm 70, the height of the second hinge shaft P2, and the height of the front portion of the link back arm 100 may be reduced.

When the second hinge shaft P2 descends as described above, the driving wheel 94 of the in-wheel motor 90 is pressed downward by the link motor arm 70. In addition, when the second hinge shaft P2 descends, the link back arm 100 is slide-guided by the rear hinge 60 and maintains contact with the ground.

Meanwhile, when the robot 10*a* passes through the lowered ground as illustrated in FIG. 10, the link motor arm 70 is reversely rotated about the first hinge shaft P1 according to the shape of the ground, and the front end of the link motor arm 70 may be inclined to tilt forward and downward.

When the link motor arm 70 is reversely rotated, the link back arm 100 is rotated about the second hinge shaft P2, and the height of the rear portion of the link motor arm 70, all the height of the second hinge shaft P2, and the height of the front portion of the link back arm 100 can increase.

When the second hinge shaft P2 is raised as described above, the driving wheel 94 of the in-wheel motor 90 is pressed upward by the link motor arm 70, and the height difference between the front caster 80 and the driving wheel 94 can be eliminated. In addition, when the second hinge shaft P2 is raised, the link back arm 100 maintains a state of being in contact with the ground while being sled and guided by the rear hinge 60.

As illustrated in FIGS. 8 to 10, the movement of the front caster 80 according to the change of the ground acts in conjunction with the driving wheel 94 and each of the rear caster 120, and the front caster 80, the driving wheel 94, and the rear casters 120 can uniformly contact the ground, and the robot 10*a* can travel stably.

FIG. 11 is a side view illustrating comparative examples compared with the present embodiment.

The comparative example illustrated in FIG. 11 is a case where the front caster 80', the in-wheel motor 90', and the rear caster 120' are independently connected to the robot frame 30, and the in-wheel motor 90' is connected to the robot frame 30 with the suspension 98. An example of the suspension 98 is a spring.

In FIG. 11, (a) is a comparative example in which the weight of the robot set is heavy and the strength of the suspension 98 is weak, and (b) is a comparative example in which the weight of the robot set is small and the strength of the suspension 98 is strong.

In the robot of the comparative example, as illustrated in (a) of FIG. 11, if the weight of the robot set is too large compared to the strength of the suspension 98, the in-wheel motor 90' may run idle and the robot cannot move forward and can stay in place.

On the other hand, as illustrated in (b) of FIG. 11, if the strength of the suspension 98 is too great compared to the weight of the robot set, the robot set may shake greatly according to the movement of the robot.

In the case of comparative examples, the load of the robot set has to be determined within a range in which the suspension 98 can operate normally. Conversely, the strength of the suspension 98 needs to be adjusted according to the load of the robot set.

The front casters 80', the in-wheel motor 90', and the rear casters 120' of the comparative examples are difficult to apply to various robots having different weights of the robot set, and restrictions on weight change of the robot frame 30 will arise.

On the other hand, in this embodiment, as illustrated in FIG. 6, each of the left wheel module 40A and the right wheel module 40B includes one driving wheel 94 and two casters 80 and 120, and, when the left wheel module 40A and the right wheel module 40B are connected by interlocking link structures 70 and 120, it is possible to secure the grip force suitable for the weight of the robot set without being restricted by the weight of the robot set. When the robot 10*a* secures a sufficient grip force, the robot 10*a* can generate an appropriate driving torque, so power consumption of the battery 33 is reduced and efficient use of the battery 33 is possible.

In addition, according to the condition of the ground, when a total of two driving wheels 94 and four casters 80 and 120 are interlocked according to the ground, while the heights of the two driving wheels 94 and the heights of the four casters 80 and 120 are corrected and the grip force can be maintained, impact can be prevented.

In this embodiment, since two hinges 50 and 60, two links 70 and 120, one driving wheel 94, and two casters 80 and 120 are modularized and configured in module units, the module units can be mounted on various types of robot sets, and the efficiency thereof can be maximized as a common module without being restricted by the shape or weight of the robot set.

Meanwhile, in this embodiment, it is also possible that the pin guide 66 is formed on the front hinge 50, the pin guide 110 is connected to the link motor arm 70 and slides along the pin guide 66, and the link back arm 100 is connected to the rear hinge 60 by the first hinge shaft P1 and rotates about the rear hinge 60 and various modifications are possible within the technical scope to which this invention belongs.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

The invention claimed is:

1. A wheel module comprising:
- a first hinge and a second hinge mounted to a bottom of a robot;
- an in-wheel motor including:
  - a drive wheel; and
  - a motor configured to rotate the drive wheel;
- a first link arm connected to the motor and rotatably coupled to the first hinge by a first hinge shaft;
- a first caster connected to the first link arm;
- a second link arm rotatably connected to the first link arm by a second hinge shaft, and coupled to the second hinge by a guide pin; and
- a second caster connected to the second link arm,
- wherein the second hinge includes a pin guide configured to guide displacement of the guide pin.

2. The wheel module of claim 1, wherein the first link arm includes:
- a first caster mount located at a front portion of the first link arm, the first caster mount being configured to rotatably support the first caster;
- a first hinge shaft penetrating portion located in a central portion of the first link arm, the first hinge shaft penetrating portion being configured to rotatably support the first hinge shaft; and
- a second hinge shaft penetrating portion located at a rear portion of the first link arm, the second hinge shaft penetrating portion being configured to rotatably support the second hinge shaft.

3. The wheel module of claim 2, wherein the first hinge includes:
- a first mounter configured to be mounted to the bottom of the robot; and
- a pair of side brackets extending from the first mounter, the pair of side brackets being spaced apart in a left and right direction, and
- wherein the first hinge shaft passes through the pair of side brackets and the first hinge shaft penetrating portion.

4. The wheel module of claim 1, wherein a height of the second hinge shaft is higher than a height of the first hinge shaft.

5. The wheel module of claim 1, wherein the first link arm includes:
- an upper arm surrounding an upper portion of a support shaft of the motor; and
- a lower arm surrounding a lower portion of the support shaft of the motor, the lower arm being fastened to the upper arm.

6. The wheel module of claim 1, wherein one of the first link arm or the second link arm has a protrusion protruding toward another of the first link arm or the second link arm, and
- wherein the another of the first link arm or the second link arm has a stop surface configured to come into contact with the protrusion or to move apart from the protrusion.

7. The wheel module of claim 6, wherein the protrusion is arranged to move away from the stop surface when a height of the first caster is higher than a height of the second caster, and
- wherein the protrusion is arranged to approach the stop surface when the height of the first caster is lower than the height of the second caster.

8. The wheel module of claim 1, wherein the pin guide is a guide hole extending in a front and rear direction of the second hinge.

9. The wheel module of claim 8, wherein the guide pin is movable into contact with a rear end of the guide hole when the second hinge shaft is lowered, and
- wherein the guide pin is movable into contact with a front end of the guide hole when the second hinge shaft is raised.

10. The wheel module of claim 1, wherein the second link arm includes:
- a second hinge shaft penetrating portion located at a front portion of the second link arm, the second hinge shaft penetrating portion being configured to rotatably support the second hinge shaft;
- a guide pin mount located at a central portion of the second link arm; and
- a second caster mount located at a rear portion of the second link arm, the second caster mount being configured to rotatably support the second caster.

11. The wheel module of claim 10, wherein the second hinge further includes:
- a second mounter configured to be mounted to the bottom of the robot; and
- a pair of side brackets protruding from the second mounter, the pair of side brackets being spaced apart in a left and right direction, and
- wherein the guide pin passes through the pair of side brackets and the guide pin mount.

12. A robot comprising:
- a robot frame including a bottom plate; and
- at least one wheel module mounted to the bottom plate,
- wherein the at least one wheel module includes:
  - a first hinge and a second hinge mounted to the bottom plate;
  - an in-wheel motor including:
    - a drive wheel; and
    - a motor configured to rotate the drive wheel;
  - a first link arm extending from the motor and rotatably connect to the first hinge by a first hinge shaft;
  - a first caster connected to the first link arm;
  - a second link arm rotatably connected to the first link arm by a second hinge shaft, and coupled to the second hinge by a guide pin; and
  - a second caster connected to the second link arm,
- wherein the second hinge includes a pin guide configured to guide displacement of the guide pin.

13. The robot of claim 12, wherein the at least one wheel module includes:
- a left wheel module mounted to the bottom plate; and
- a right wheel module mounted to the bottom plate to be spaced apart from the left wheel module.

14. The robot of claim 12, wherein the first link arm extends from the motor in a forward direction of the robot, and wherein the second link arm extends from the first link arm in a rearward direction of the robot.

15. The robot of claim 14, wherein the first link arm includes:

a first caster mount located at a front portion of the first link arm, the first caster mount being configured to rotatably support the first caster;

a first hinge shaft penetrating portion located in a central portion of the first link arm, the first hinge shaft penetrating portion being configured to rotatably support the first hinge shaft; and a second hinge shaft penetrating portion located at a rear portion of the first link arm, the second hinge shaft penetrating portion being configured to rotatably support the second hinge shaft.

16. The robot of claim 12, wherein the second link arm includes:

a second hinge shaft penetrating portion located at a front portion of the second link arm, the second hinge shaft penetrating portion being configured to rotatably support the second hinge shaft;

a guide pin mount located at a central portion of the second link arm; and a second caster mount located at a rear portion of the second link arm, the second caster mount being configured to rotatably support the second caster.

17. The robot of claim 12, wherein a height of the second hinge shaft is higher than a height of the first hinge shaft.

18. The robot of claim 12, wherein one of the first link arm or the second link arm has a protrusion protruding toward another of the first link arm or the second link arm, and wherein the another of the first link arm or the second link arm has a stop surface configured to come into contact with the protrusion or to move apart from the protrusion.

19. The robot of claim 12, wherein the pin guide is a guide hole extending in a front and rear direction of the second hinge.

20. A wheel module comprising:

an in-wheel motor including:

a drive wheel; and a motor configured to rotate the drive wheel;

a first link arm connected to the motor;

a first hinge rotatably connected to the first link arm by a first hinge shaft;

a first caster connected to the first link arm;

a second link arm connected to the first link arm by a second hinge shaft, the second link arm including a guide pin;

a second hinge connected to the second link arm, the second hinge including a pin guide configured to guide displacement of the guide pin; and a second caster connected to the second link arm, wherein the second link arm includes:

a second hinge shaft penetrating portion located at a front portion of the second link arm;

a guide pin mount located at a central portion of the second link arm; and a second caster mount located at a rear portion of the second link arm.

* * * * *